(12) United States Patent
Takase et al.

(10) Patent No.: US 11,496,788 B2
(45) Date of Patent: Nov. 8, 2022

(54) INFORMATION PROCESSING SYSTEM, INFORMATION PROCESSING APPARATUS, AND CONTENT FILE GENERATION METHOD

(71) Applicant: SONY INTERACTIVE ENTERTAINMENT INC., Tokyo (JP)

(72) Inventors: Masaki Takase, Tokyo (JP); Masahiro Fujihara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/278,932

(22) PCT Filed: Oct. 2, 2019

(86) PCT No.: PCT/JP2019/038957
§ 371 (c)(1),
(2) Date: Mar. 23, 2021

(87) PCT Pub. No.: WO2020/075593
PCT Pub. Date: Apr. 16, 2020

(65) Prior Publication Data
US 2021/0297720 A1  Sep. 23, 2021

(30) Foreign Application Priority Data
Oct. 9, 2018 (JP) .............................. JP2018-190876

(51) Int. Cl.
*H04N 21/278* (2011.01)
*G11B 27/34* (2006.01)
(Continued)

(52) U.S. Cl.
CPC .......... *H04N 21/278* (2013.01); *G11B 27/34* (2013.01); *H04N 21/42203* (2013.01); *H04N 21/4334* (2013.01); *H04N 21/44218* (2013.01)

(58) Field of Classification Search
CPC .......... H04N 21/278; H04N 21/42203; H04N 21/4334; H04N 21/44218; H04N 21/2743;
(Continued)

(56) References Cited

U.S. PATENT DOCUMENTS 8,438,590 B2 *  5/2013  Crenshaw .......... H04N 21/4223
                                                       725/12
10,864,447 B1 *  12/2020  Willette .................. A63F 13/86
(Continued)

FOREIGN PATENT DOCUMENTS

JP  2006006853 A  1/2006
JP  2007313001 A  12/2007
(Continued)

OTHER PUBLICATIONS

International Preliminary Report on Patentability dated Apr. 22, 2021, from PCT/JP2019/038957, 13 sheets.
(Continued)

*Primary Examiner* — John R Schnurr
(74) *Attorney, Agent, or Firm* — Katten Muchin Rosenman LLP

(57) ABSTRACT

A voice acquisition section 126 acquires a voice of a user viewing content. A recording processing section 116 records content data and user voice data and generates a content file in which the content data and the user voice data are associated with a recording time. A voice detection section 136 detects whether or not the voice of the user has been acquired by the voice acquisition section 126. An event information generation section 140 generates event information including a start time and an end time of the acquisition of the voice of the user. A communication section 102 transmits the event information to a server.

8 Claims, 16 Drawing Sheets

(51) Int. Cl.
*H04N 21/422* (2011.01)
*H04N 21/433* (2011.01)
*H04N 21/442* (2011.01)

(58) Field of Classification Search
CPC ......... H04N 21/47217; H04N 21/4781; H04N 21/6582; H04N 21/84; H04N 21/8455; G11B 27/34; G11B 27/11; A63F 13/215; A63F 13/424; A63F 13/533; A63F 13/49; A63F 13/86; G06F 13/00
See application file for complete search history.

(56) References Cited

U.S. PATENT DOCUMENTS

| | | | |
|---|---|---|---|
| 10,897,647 B1 * | 1/2021 | Hunter Crawley | H04N 21/44 |
| 2015/0020086 A1 * | 1/2015 | Chen | H04H 60/46 725/12 |
| 2018/0316962 A1 * | 11/2018 | Prakash | H04N 21/47217 |
| 2020/0053430 A1 * | 2/2020 | Burke | H04N 21/47217 |
| 2021/0037295 A1 * | 2/2021 | Strickland | H04N 21/6582 |

FOREIGN PATENT DOCUMENTS

| | | |
|---|---|---|
| JP | 2011-072735 A | 4/2011 |
| JP | 2012-209823 A | 10/2012 |
| JP | 2014053943 A | 3/2014 |
| JP | 2014064638 A | 4/2014 |
| JP | 2015-013103 A | 1/2015 |
| JP | 2015-136050 A | 7/2015 |
| JP | 2018-113514 A | 7/2018 |
| WO | 2017218306 A1 | 12/2017 |

OTHER PUBLICATIONS

International Search Report and Written Opinion dated Dec. 10, 2019, from PCT/JP2019/038957, 9 sheets.

Decision to Grant a Patent dated May 10, 2022, from Japanese Patent Application No. 2020-550510, 3 sheets.

* cited by examiner

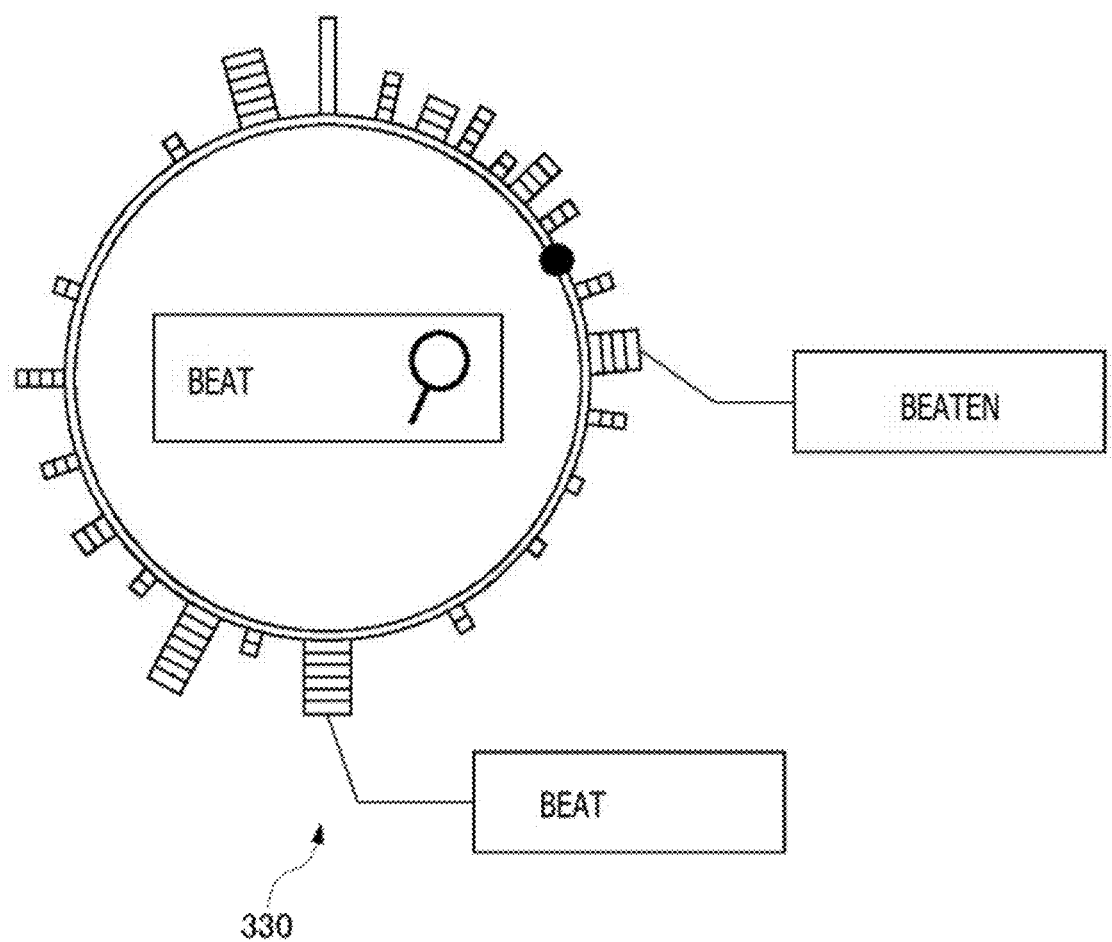

INFORMATION PROCESSING SYSTEM, INFORMATION PROCESSING APPARATUS, AND CONTENT FILE GENERATION METHOD

TECHNICAL FIELD

The present disclosure relates to a technique for generating a content file and/or a technique for reproducing a content file.

BACKGROUND ART

PTL 1 discloses an information processing apparatus that allows a user to select a type of game image and sound data sharing processing. The information processing apparatus presents the user with a plurality of option graphical user interfaces (GUIs) related to image and sound data sharing. One option GUI specifies a process of uploading played game image and sound data recorded on an auxiliary storage apparatus to a video distribution server. Another option GUI specifies a process of live broadcasting, via the video distribution server, the game image and sound data being played.

PTL 2 discloses an information processing apparatus for sharing user's feedback on content. The information processing apparatus includes an activity acquiring unit, a scene extracting unit, and a feedback diverting unit. The activity acquiring unit acquires the activity of a first user in a first scene of content. The scene extracting unit extracts a second scene similar to the first scene from the same content or different content. The feedback diverting unit diverts a feedback, which arises in the first scene in response to the activity of the first user, to the second scene provided to a second user.

CITATION LIST

Patent Literature

[PTL 1] Japanese Patent Laid-Open No. 2018-113514
[PTL 2] Japanese Patent Laid-Open No. 2015-136050

SUMMARY

Technical Problem

Since an image sharing site has many items of content uploaded thereto, a viewing user cannot easily determine which content is interesting. Meanwhile, a distributing user who uploads content to the image sharing site wants many viewing users to view the content. Nevertheless, since the content is buried in many items of content, it is difficult to get viewing users to view the content. Therefore, there is a need to realize a system that can automatically associate information which is likely to attract viewers' interests with content, so that viewing users can instantly grasp the highlight of the content.

Therefore, it is an object of the present disclosure to provide a technique for generating event information to be included in a content file and/or a technique for presenting viewing users with a noteworthy point of content.

Solution to Problem

In order to solve the above-described problem, an aspect of the present disclosure relates to an information processing system in which an information processing apparatus is connected to one or more servers. The information processing apparatus includes a voice acquisition section configured to acquire a voice of a user viewing content, a recording processing section configured to record content data and user voice data acquired by the voice acquisition section and generate a content file in which the content data and the user voice data are associated with a recording time, a voice detection section configured to detect whether or not the voice of the user has been acquired by the voice acquisition section, an event information generation section configured to generate event information including a start time and an end time of the acquisition of the voice of the user, and a transmission section configured to transmit the event information to a server. The server includes an event information acquisition section configured to acquire the event information transmitted from the information processing apparatus.

Another aspect of the present disclosure is an information processing apparatus including an activity acquisition section configured to acquire an activity of a user viewing content, a recording processing section configured to generate a content file in which content data is associated with a recording time, an activity detection section configured to detect whether or not the activity of the user has been acquired by the activity acquisition section, an event information generation section configured to generate event information including a start time and an end time of the acquisition of the activity of the user, and a transmission section configured to transmit the event information to a server.

Still another aspect of the present disclosure is a content file generation method including a step of acquiring an activity of a user viewing content, a step of generating a content file in which content data is associated with a recording time, a step of detecting whether or not the activity of the user has been acquired, a step of generating event information including a start time and an end time of the acquisition of the activity of the user, and a step of transmitting the event information to a server.

It is noted that any combinations of the constituent components described above and the expressions of the present disclosure that are converted between a method, an apparatus, a system, a recording medium, a computer program, and the like are also effective as aspects of the present disclosure.

BRIEF DESCRIPTION OF DRAWINGS

FIG. 16 is a view illustrating a text search box.

DESCRIPTION OF EMBODIMENT

Figure 1:
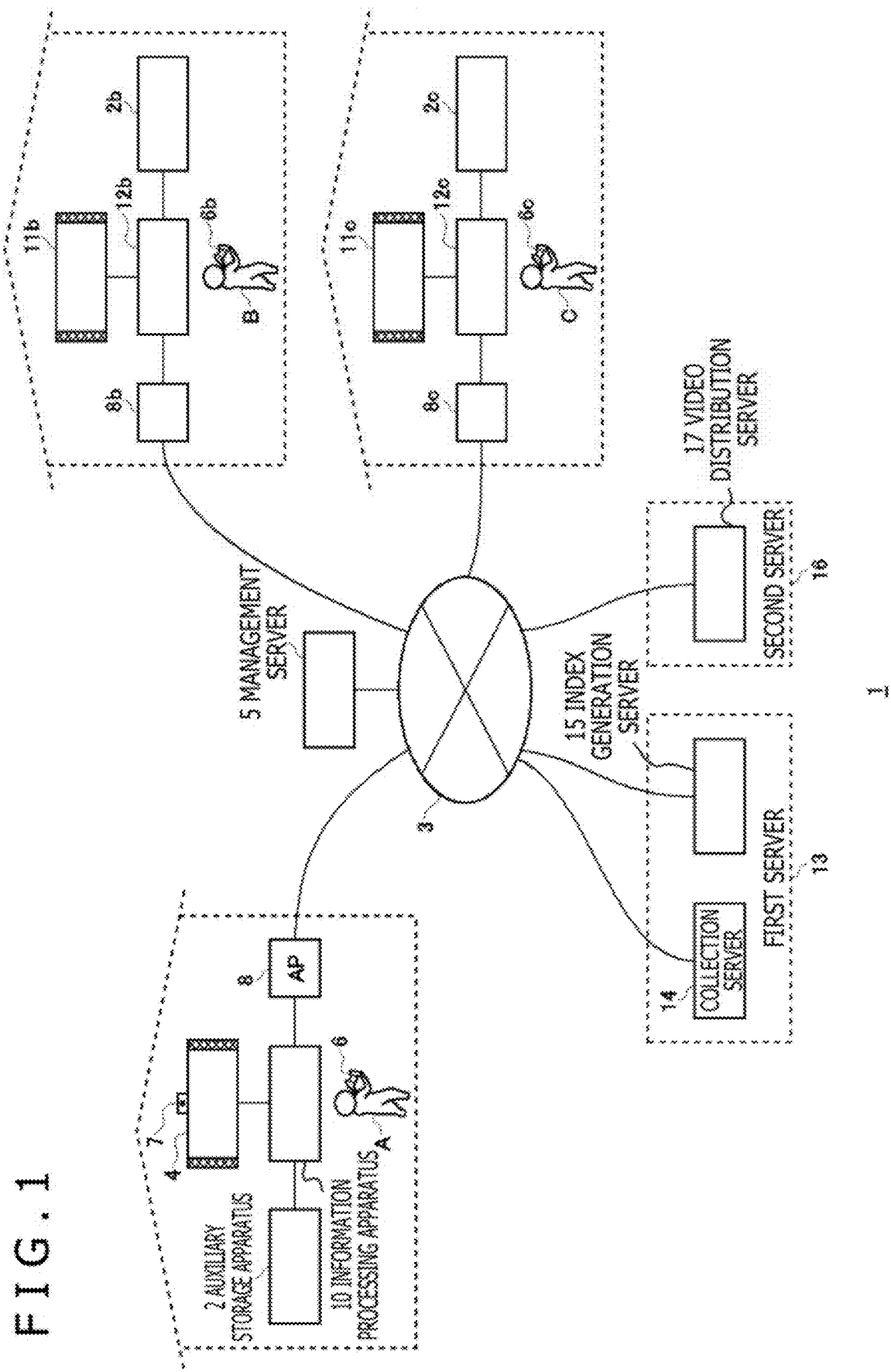
FIG. 1 is a diagram illustrating an information processing system according to an embodiment.

FIG. 1 illustrates an information processing system 1 according to an embodiment of the present disclosure. The information processing system 1 includes an information processing apparatus 10, information processing apparatuses 12b and 12c, and one or more servers. The information processing apparatus 10 is operated by a user A who is a distributor. The information processing apparatuses 12b and 12c (hereinafter referred to as an "information processing apparatus 12" in a case where there is no need to particularly distinguish between them) are respectively operated by users B and C who are viewing users. The information processing apparatus 10, the information processing apparatus 12, and the one or more servers are connected via a network 3 such as the Internet. The one or more servers include a management server 5, a first server 13, and a second server 16. In the embodiment, the management server 5 and the first server 13 may be managed by one operating entity that provides a network service, while the second server 16 may be managed by another operating entity, for example, an entity that does video distribution business.

In the information processing system 1, the information processing apparatus 12 of the viewing user may be the same apparatus as the information processing apparatus 10 of the distributing user. In the case of the same apparatuses, peripheral configurations of the information processing apparatus 12 are the same as peripheral configurations of the information processing apparatus 10. Thus, the peripheral configurations of the information processing apparatus 10 will be representatively described below.

An access point (hereinafter referred to as an "AP") 8 has functions of a wireless access point and a router. The information processing apparatus 10 is wirelessly or wiredly connected to the AP 8, through which the information processing apparatus 10 is communicably connected to the management server 5, the first server 13, and the second server 16 on the network 3.

An input apparatus 6 operated by the user A is wirelessly or wiredly connected to the information processing apparatus 10 and outputs user's operation information to the information processing apparatus 10. In response to receiving the operation information from the input apparatus 6, the information processing apparatus 10 reflects the operation information in the processing of system software and application software and causes an output apparatus 4 to output the processing result. In the embodiment, the application software refers to game software. The information processing apparatus 10 refers to a game apparatus that executes the game software. The input apparatus 6 may be equipment, such as a game controller, that supplies the user's operation information to the information processing apparatus 10. The input apparatus 6, which is a game controller, includes a plurality of input sections, such as a plurality of push-type operation buttons, an analog stick capable of inputting an analog quantity, and a rotary button.

An auxiliary storage apparatus 2 is a large-capacity storage apparatus such as a hard disk drive (HDD) or a flash memory. The auxiliary storage apparatus 2 may be an external storage apparatus connected to the information processing apparatus 10 via a universal serial bus (USB) or the like or may be a built-in storage apparatus. The output apparatus 4 may be a television including a display that outputs images and a speaker that outputs sound. The output apparatus 4 may be connected to the information processing apparatus 10 with a wired cable or may be connected to the information processing apparatus 10 wirelessly.

A camera 7 is a stereo camera and captures a space in the vicinity of the output apparatus 4. Although FIG. 1 illustrates an example in which the camera 7 is attached to an upper portion of the output apparatus 4, the camera 7 may be provided on a side portion of the output apparatus 4. In either case, the camera 7 is provided in a position at which the camera 7 can capture the user A playing a game in front of the output apparatus 4.

The information processing apparatus 10 uploads a game image and sound file (content file) played by the user A to a video distribution server 17, which is the second server 16. The users B and C, who are the viewing users, can view the content file uploaded by the user A by accessing the video distribution server 17 from the respective information processing apparatuses 12. In this manner, the information processing system 1 functions as a content file distribution system.

The management server 5 provides a network service for the information processing apparatus 10 and the information processing apparatus 12. The management server 5 manages network accounts for identifying users, and each user signs in to the network service using the user's network account. By signing in to the network service, each user can register save data of a game and a virtual award (trophy) earned during game play in the management server 5 and can also transmit event information that has occurred during the game play to the first server 13. It is noted that, although the video distribution server 17, which is the second server 16, is operated by a different operating entity from the entity providing the network service in the embodiment, the viewing user can view a content file uploaded to the video distribution server 17 via the network service. By accessing the video distribution server 17 via the network service, the viewing user can advantageously view the content file provided by the video distribution server 17 using an index file generated by the first server 13.

The information processing apparatus 10 detects the activity of the user A viewing content and transmits the activity to the first server 13 as event information. In the embodiment, a situation where the user A playing a game is viewing content is synonymous with a situation where the user A is viewing a game image and listening to game sound of the game being played by the user A. The activity of the user A may be, for example, utterance, a large movement of the user's body, or a large movement of the input apparatus 6 during the game play. The activity that is automatically detected by the information processing apparatus 10 is set to an action from which excitement of the user A during the game play is inferred.

The first server 13 collects the activity of the user A as event information during the game play. When a content file including recorded game play has been uploaded to the second server 16, the first server 13 generates an index file in which pieces of event information collected during the game play are put together. It is noted that the information processing apparatus 10 may transmit, to the first server 13, not only the activity of the user A but also any event information from which excitement in the game play is inferred. An event to be transmitted may be a game event set in the game.

A button configuration of the input apparatus 6 will now be described.

Figure 2:
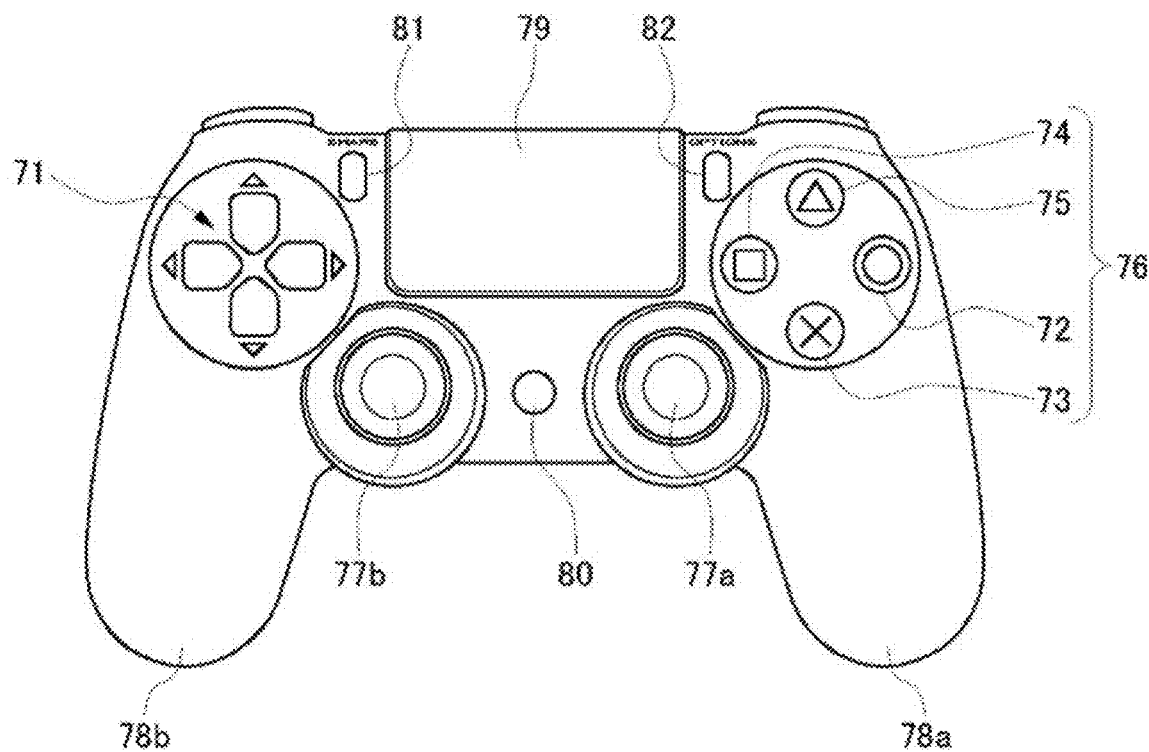
FIG. 2 is a view illustrating an external configuration of an upper surface of an input apparatus.

FIG. 2 illustrates an external configuration of an upper surface of the input apparatus. The user grips a left-side grip portion 78b with the left hand and a right-side grip portion 78a with the right hand to operate the input apparatus 6. Direction keys 71, analog sticks 77a and 77b, and four types of operation buttons 76 are provided on an upper surface of a housing of the input apparatus 6. The four types of buttons 72 to 75 are marked with different shapes in different colors to distinguish between them. The ○ button 72 is marked with a red circle. The x button 73 is marked with a blue cross. The ■ button 74 is marked with a purple rectangle. The Δ button 75 is marked with a green triangle.

A function button 80 is provided between the two analog sticks 77a and 77b. The function button 80 is used to turn on the power supply of the input apparatus 6 and, at the same time, activate a communication function that connects the input apparatus 6 to the information processing apparatus 10. It is noted that, in a case where the function button 80 is depressed while the main power supply of the information processing apparatus 10 is off, the information processing apparatus 10 receives a connection request transmitted from the input apparatus 6 as an instruction to turn on the main power supply. Consequently, the main power supply of the information processing apparatus 10 is turned on. After the input apparatus 6 is connected to the information processing apparatus 10, the function button 80 is also used to cause the information processing apparatus 10 to display a home screen.

A touch pad 79 is provided in a flat region between the direction keys 71 and the operation buttons 76. The touch pad 79 sinks down when the user depresses the touch pad 79 and returns to the original position when the user releases the touch pad 79. In this manner, the touch pad 79 also functions as a depression-type button. A SHARE button 81 is provided between the touch pad 79 and the direction keys 71. The SHARE button 81 is used to input an instruction from the user to an operating system (OS) or the system software of the information processing apparatus 10. Further, an OPTIONS button 82 is provided between the touch pad 79 and the operation buttons 76. The OPTIONS button 82 is used to input an instruction from the user to an application (game) executed on the information processing apparatus 10.

The input apparatus 6 includes a motion sensor including a three-axis angular velocity sensor and a three-axis acceleration sensor. The input apparatus 6 transmits sensor data and operation information of each of various input sections to the information processing apparatus 10 in a predetermined cycle.

Figure 3:
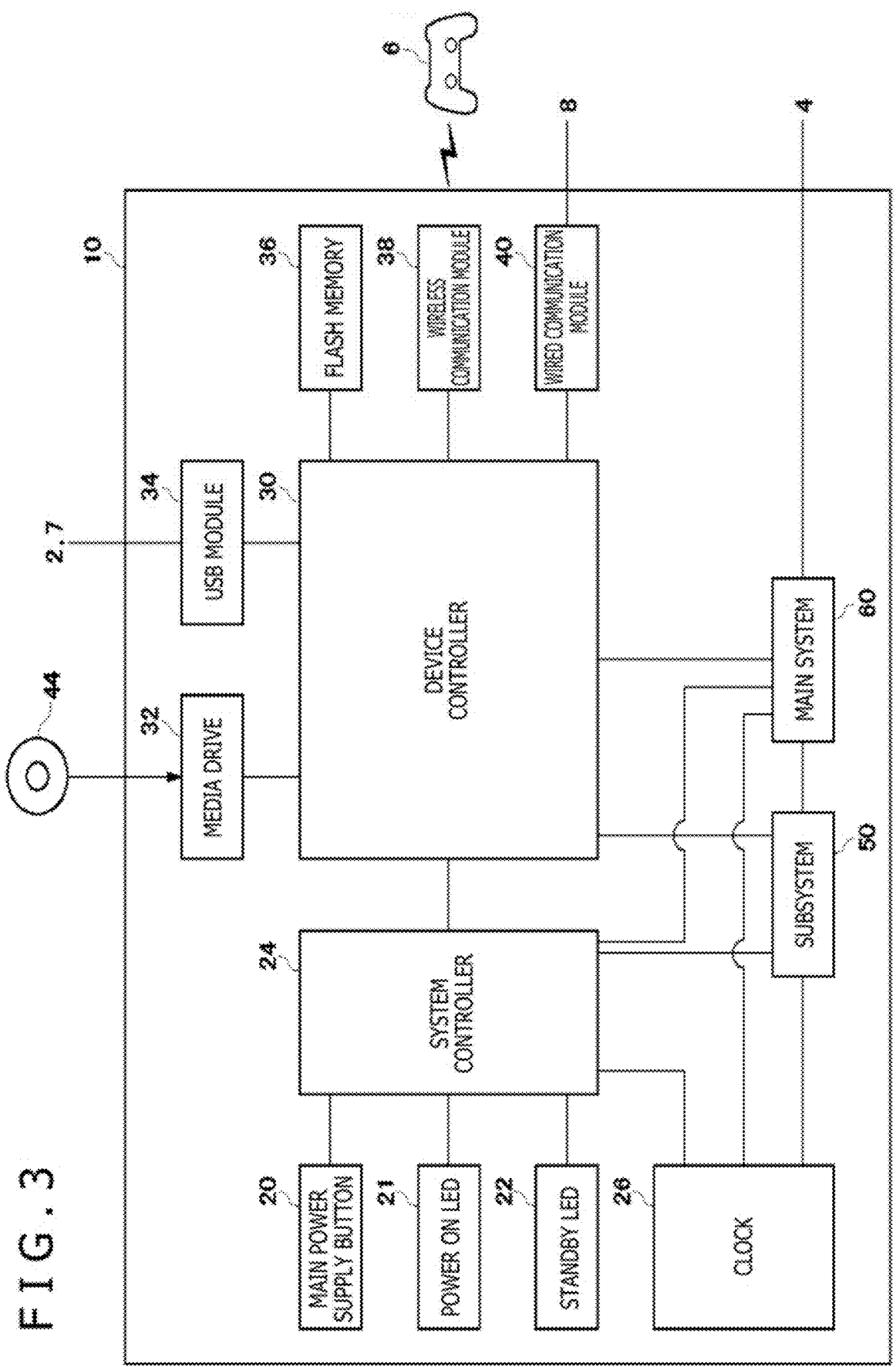
FIG. 3 is a diagram illustrating a hardware configuration of an information processing apparatus.

FIG. 3 illustrates a hardware configuration of the information processing apparatus 10. The information processing apparatus 10 includes a main power supply button 20, a power ON light emitting diode (LED) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a memory that serves as a main storage apparatus, a memory controller, a graphics processing unit (GPU), and the like. The GPU is mainly used for arithmetic processing of game programs. These functions may be configured as a system-on-a-chip and formed on a single chip. The main CPU has functions of activating the OS and executing applications installed in the auxiliary storage apparatus 2 under an environment provided by the OS.

The subsystem 50 includes a sub CPU, a memory that serves as a main storage apparatus, a memory controller, and the like, and does not include a GPU. The sub CPU operates even while the main CPU is in a standby state, and its processing functions are limited so as to keep power consumption low. It is noted that the sub CPU and the memory may be formed on separate chips.

The main power supply button 20 is an input section to which the user inputs an operation. The main power supply button 20 is provided on a front surface of the housing of the information processing apparatus 10 and is operated to turn on or off the power supply to the main system 60 of the information processing apparatus 10. An on state of the main power supply means that the main system 60 is in an active state. An off state of the main power supply means that the main system 60 is in the standby state. The power ON LED 21 lights up when the main power supply button 20 is turned on, while the standby LED 22 lights up when the main power supply button 20 is turned off.

The system controller 24 detects the user's depression on the main power supply button 20. When the main power supply button 20 is depressed while the main power supply is in the off state, the system controller 24 acquires this depression operation as an "on instruction." On the other hand, when the main power supply button 20 is depressed while the main power supply is the on state, the system controller 24 acquires this depression operation as an "off instruction."

While the main CPU has a function of executing a game program installed in the auxiliary storage apparatus 2 or a read only memory (ROM) medium 44, the sub CPU does not have such a function. However, the sub CPU has a function of accessing the auxiliary storage apparatus 2 and a function of transmitting and receiving data to and from the management server 5. Since the sub CPU has only these limited processing functions, the sub CPU can operate with small power consumption as compared to the main CPU. These sub CPU functions are executed when the main CPU is in the standby state. Since the subsystem 50 is operating while the main system 60 is in the standby state, the information processing apparatus 10 according to the embodiment maintains a state of being signed in to the network service provided by the management server 5 at all times.

The clock 26 is a real-time clock. The clock 26 generates current date and time information and supplies the current date and time information to the system controller 24, the subsystem 50, and the main system 60.

The device controller 30 is configured as a large-scale integrated circuit (LSI) that transfers information between devices, as does a Southbridge. As illustrated, devices such as the system controller 24, the media drive 32, the USB module 34, the flash memory 36, the wireless communication module 38, the wired communication module 40, the subsystem 50, and the main system 60 are connected to the device controller 30. The device controller 30 controls the timing of data transfer by absorbing differences in electrical characteristics and data transfer speed between the devices.

The media drive 32 is a drive apparatus that drives the ROM medium 44 with the ROM medium 44 loaded therein and reads a program, data, and the like from the ROM medium 44. Application software such as games and license information are recorded on the ROM medium 44. The ROM medium 44 is a read-only recording medium such as an optical disc, an optical magnetic disc, or a Blu-ray disc.

The USB module 34 is a module connected to external equipment via a USB cable. The USB module 34 may be connected to the auxiliary storage apparatus 2 and the camera 7 via a USB cable. The flash memory 36 is an auxiliary storage apparatus constituting an internal storage. The wireless communication module 38 wirelessly communicates with, for example, the input apparatus 6 under a communication protocol such as a Bluetooth (registered trademark) protocol or an IEEE 802.11 protocol. The wired communication module 40 wiredly communicates with external equipment. For example, the wired communication module 40 is connected to the network 3 via the AP 8.

Figure 4:
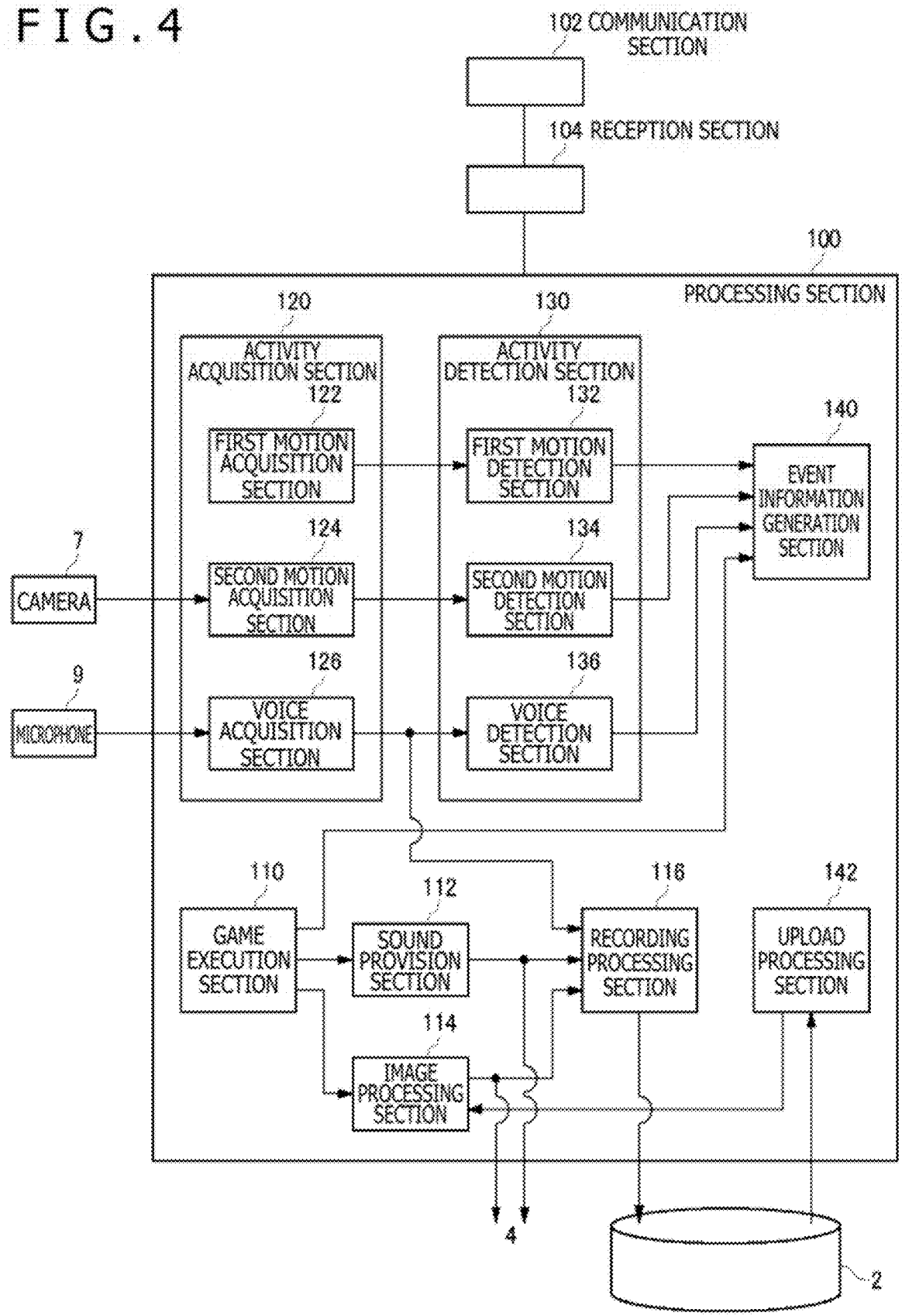
FIG. 4 is a diagram illustrating functional blocks of the information processing apparatus.

FIG. 4 illustrates functional blocks of the information processing apparatus 10 operating as a distribution apparatus that uploads a content file to the video distribution server 17. The information processing apparatus 10 includes a processing section 100, a communication section 102, and a reception section 104. The processing section 100 includes a game execution section 110, a sound provision section 112, an image processing section 114, a recording processing section 116, an activity acquisition section 120, an activity detection section 130, an event information generation section 140, and an upload processing section 142.

Each of the components described as the functional blocks performing various processes in FIG. 4 can be constituted by a circuit block, a memory, or another LSI in terms of hardware, and is implemented by the system software, a game program loaded in a memory, or the like in terms of software. Therefore, it is to be understood by those skilled in the art that these functional blocks can be implemented in various forms by hardware only, software only, or combinations of hardware and software, and are not limited to any of these forms.

The communication section 102 receives operation information regarding a user operation on the input section of the input apparatus 6. Further, the communication section 102 transmits event information generated by the processing section 100 to the first server 13 and a content file to the second server 16. The communication section 102 is represented as a configuration having both of the functions of the wireless communication module 38 and the wired communication module 40 illustrated in FIG. 3.

The reception section 104 is provided between the communication section 102 and the processing section 100, and transfers data or information between the communication section 102 and the processing section 100. When the reception section 104 receives operation information of the input section, which is provided on the input apparatus 6, via the communication section 102, the reception section 104 supplies the operation information to the game execution section 110 and/or the upload processing section 142 in the processing section 100. The reception section 104 may supply the operation information and sensor data of the input apparatus 6 to a first motion acquisition section 122.

The game execution section 110 executes game software (hereinafter occasionally simply referred to as a "game") to generate image data and sound data of the game. Functions described as the game execution section 110 are implemented by the system software, the game software, the hardware such as the GPU, and the like. It is noted that the game is an example of an application, and the game execution section 110 may execute an application other than the game.

While the user A is playing the game, the game execution section 110 performs arithmetic processing by which a player character is moved in a virtual space on the basis of operation information input to the input apparatus 6 by the user A. The game execution section 110 includes a GPU that performs rendering processing and the like. In response to the result of the arithmetic processing in the virtual space, the game execution section 110 generates game image data from a viewpoint position (a virtual camera) in the virtual space. Further, the game execution section 110 generates game sound data used in the virtual space.

The image processing section 114 provides play image data to the output apparatus 4, and the sound provision section 112 provides play sound data to the output apparatus 4, so that a play image and play sound are output from the output apparatus 4. The user A plays the game by operating the input apparatus 6 while viewing the content (i.e., the play image and the play sound) output from the output apparatus 4.

The recording processing section 116 records the play image data provided by the image processing section 114 and the play sound data provided by the sound provision section 112 in association with a recording time. The recording time may be an absolute time. Hereinafter, the play image data and the play sound data will be occasionally collectively referred to as "content data." At a predetermined timing, for example, at a timing of the end of the user A's play, the recording processing section 116 generates a content file in which the recorded content data is associated with the recording time. The recording processing section 116 may generate the content file in a predetermined compression format.

In response to the start of the user A's game paly, the recording processing section 116 starts recording content data on the auxiliary storage apparatus 2 together with the recording time on the basis of an explicit instruction from the user A or automatically. It is noted that a ring buffer may be used to record content data, and when the recorded content data exceeds a predetermined capacity or a predetermined time, old data may be successively overwritten with new data.

The activity acquisition section 120 acquires the activity of the user A viewing the content. The activity acquired by the activity acquisition section 120 is set to an action, such as utterance during the game play, from which excitement of the user A can be inferred. The activity acquisition section 120 includes the first motion acquisition section 122, a second motion acquisition section 124, and a voice acquisition section 126.

The activity detection section 130 detects whether or not the activity of the user has been acquired by the activity acquisition section 120. In the information processing apparatus 10, the acquisition of the activity means the occurrence of an event. Since the activity is set to an action from which excitement of the user A can be inferred, if, for example, the user A is playing the game while remaining still, the activity detection section 130 does not detect the acquisition of the activity by the activity acquisition section 120. The activity detection section 130 includes a first motion detection section 132, a second motion detection section 134, and a voice detection section 136.

The first motion acquisition section 122 periodically acquires data of the motion sensor of the input apparatus 6 from the reception section 104. The data of the motion sensor refers to data obtained by detecting the movement (motion) of the input apparatus 6. The first motion detection section 132 calculates the amount of movement of the input apparatus 6 from the acquired sensor data and detects whether or not the amount of movement of the input apparatus 6 has exceeded a predetermined threshold value.

The amount of movement to be calculated may include acceleration, moving speed, moving amount, and the like of the input apparatus 6. The amount of movement is an index for evaluating whether or not the input apparatus 6 is being moved intensely or significantly. When the amount of movement has exceeded the predetermined threshold value, the first motion detection section 132 detects that the input apparatus 6 is being moved intensely or significantly. When the first motion detection section 132 detects that the amount of movement of the input apparatus 6 has exceeded the predetermined threshold value, the first motion detection section 132 stores the occurrence time of a first motion event. When the first motion detection section 132 detects that the amount of movement of the input apparatus 6 has fallen below the predetermined threshold value, the first motion detection section 132 stores the end time of the first motion event. After the end of the first motion event, the first motion detection section 132 supplies the occurrence time and the end time of the first motion event to the event information generation section 140.

The second motion acquisition section 124 periodically acquires image data captured by the camera 7. The second motion acquisition section 124 identifies the movement of the user A from the captured image data and performs image analysis to analyze the movement of the user A. The second motion detection section 134 calculates the amount of movement from the analyzed user A's movement and detects whether or not the amount of movement of the user A has exceeded a predetermined threshold value.

The amount of movement to be calculated may include acceleration, moving speed, moving amount, and the like of a specific part of the user A. The specific part may be the head, and the second motion acquisition section 124 analyzes the movement of the head of the user A, and the second motion detection section 134 calculates the amount of movement of the head. The amount of movement of the head is an index for evaluating whether or not the user A is moving intensely or significantly. When the amount of movement of the user head has exceeded the predetermined threshold value, the second motion detection section 134 detects that the head is moving intensely or significantly. When the second motion detection section 134 detects that the amount of movement of the user head has exceeded the predetermined threshold value, the second motion detection section 134 stores the occurrence time of a second motion event. When the second motion detection section 134 detects that the amount of movement of the user head has fallen below the predetermined threshold value, the second motion detection section 134 stores the end time of the second motion event. After the end of the second motion event, the second motion detection section 134 supplies the occurrence time and the end time of the second motion event to the event information generation section 140.

The voice acquisition section 126 acquires the voice of the user A input into a microphone 9. When the user A utters, the uttered voice is input into the microphone 9, and the voice acquisition section 126 acquires user voice data.

The voice data acquired by the voice acquisition section 126 is supplied to the recording processing section 116. Therefore, the recording processing section 116 records the voice data uttered by the user A together with the content data. At this time, the recording processing section 116 records the content data and the user voice data acquired by the voice acquisition section 126 in the auxiliary storage apparatus 2 in association with the recording time. Then, at the predetermined timing, the recording processing section 116 generates a content file in which the content data and the user voice data are associated with the recording time. After the end of the game play, the user A can upload the generated content file to the video distribution server 17.

The voice detection section 136 detects whether or not the user voice has been acquired by the voice acquisition section 126. The voice detection section 136 may be a module that implements a voice activity detection (VAD) function. It is noted that the voice acquisition section 126 may acquire the user voice data by canceling the game sound output from the output apparatus 4 using an echo canceller. This allows the voice detection section 136 to efficiently detect the presence or absence of the user voice.

When the voice detection section 136 detects that the user voice has been acquired by the voice acquisition section 126, the voice detection section 136 stores the occurrence time of the voice event. When the voice detection section 136 detects that the user voice is not acquired by the voice acquisition section 126 any longer, the voice detection section 136 stores the end time of the voice event. After the end of the voice event, the voice detection section 136 supplies the occurrence time and the end time of the voice event to the event information generation section 140.

It is noted that the voice detection section 136 may detect voice volume during the voice event. The voice detection section 136 may supply voice volume information to the event information generation section 140 together with the occurrence time and the end time of the voice event.

For example, in a case where the user A is playing the game while chatting with a friend, the recording processing section 116 may record chat voice data of the friend together with the content data. At this time, the voice detection section 136 may detect whether or not the chat voice of the friend is present, and supply the occurrence time and the end time of this chat voice event to the event information generation section 140.

It is noted that, in a case where the presence of the voice has been detected by the voice detection section 136, speech recognition may be performed on the detected voice to acquire character data (text data). Speech recognition processing may be performed by the information processing apparatus 10 or an external server. In a case where speech recognition processing is performed, the voice detection section 136 supplies the text data, which is the result of speech recognition, to the event information generation section 140 in addition to the occurrence time and the end time of the voice event.

It is noted that the activity detection section 130 may detect the activities other than those described above. For example, the first motion acquisition section 122 may acquire the movement of the player character in the game by acquiring the operation information of the input section, other than the sensor data of the input apparatus 6. For example, assume that a combination of a plurality of key operations activates a special move. In this case, in response to the first motion acquisition section 122 acquiring the combination of the plurality of key operations, the first motion detection section 132 may detect the activity. Further, in a case where the input section of the input apparatus 6 is operated with a high frequency, the first motion detection section 132 may also detect the activity. For example, the first motion acquisition section 122 may acquire the operation information of the input section, and the first motion detection section 132 may detect the activity by detecting that the number of button operations or the number of operations of the analog stick in a unit time has exceeded a predetermined number of times.

The event information generation section 140 generates event information including the start time of and the end time of acquisition of the user activity detected by the activity detection section 130. The event information includes at least information indicating the type of activity (event type information). Further, voice event information may also include voice volume and the result of voice recognition.

It is noted that a game manufacturer occasionally sets up a game event corresponding to play status during a game. The game event is, for example, an event in which a player character plays against a final boss or an event in which a player character scores a goal in a football game. When the game event has occurred during the game, a predetermined sound effect and video are reproduced to make the game more exciting with the effects. The event information generation section 140 according to the embodiment is notified of the occurrence and the end of the game event by the game execution section 110 and generates event information associated with the occurrence time and the end time. It is noted that the game execution section 110 may notify the event information generation section 140 of the occurrence time and the end time of a vibration signal during output of the vibration signal. The vibration signal drives a vibration element of the input apparatus 6.

Figure 5:
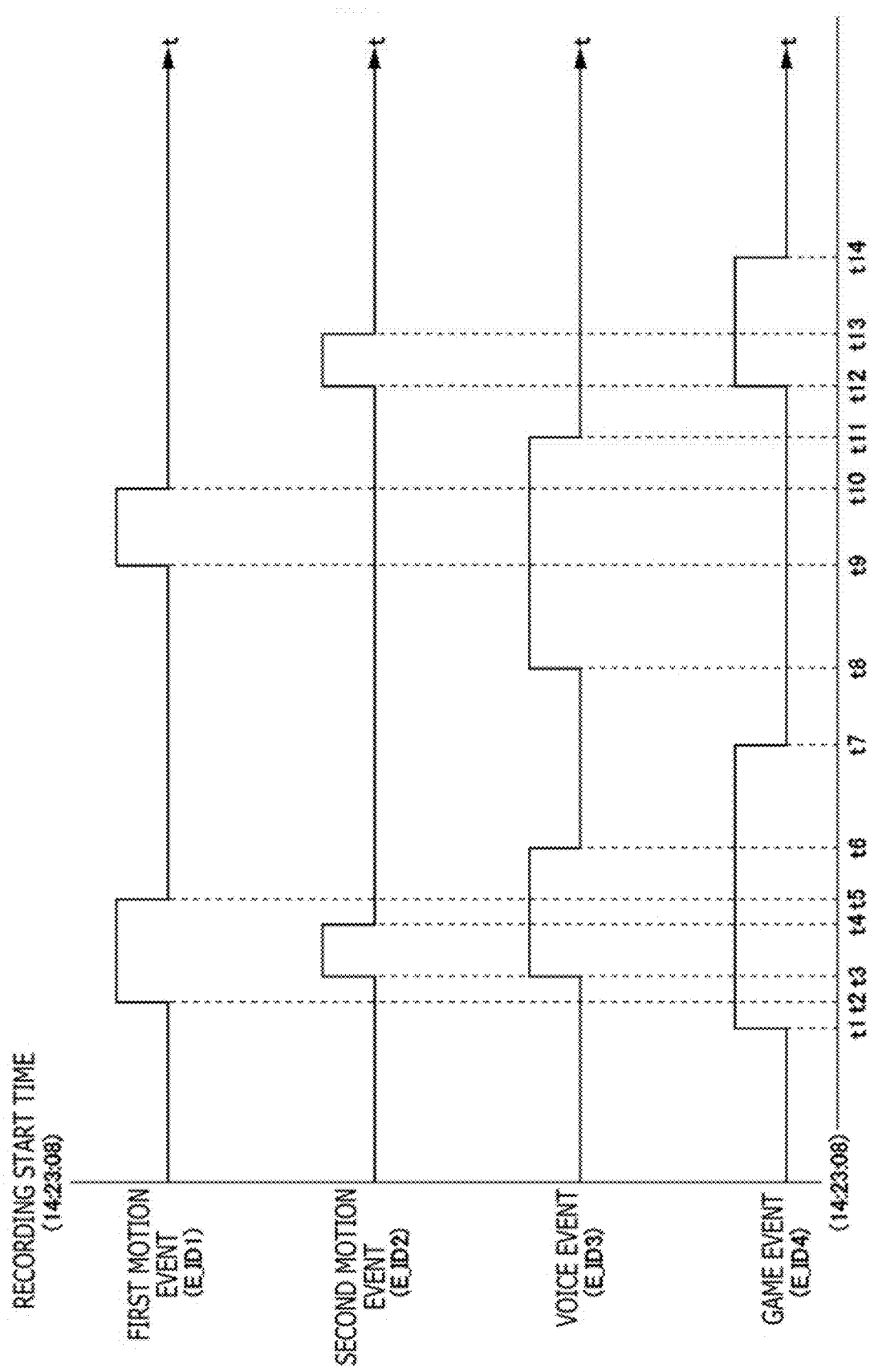
FIG. 5 is a diagram illustrating an example of event information.

FIG. 5 illustrates an example of event information generated by the event information generation section 140. The event information generation section 140 generates event information on the basis of the result of detection output from the activity detection section 130 and a game event notified by the game execution section 110. In this example, the recording processing section 116 starts recording content data at time 14:23:08.

The event information generation section 140 generates event information including a combination of at least event type information and event time information. Hereinafter, event type information of a first motion event is defined as E_ID1, event type information of a second motion event as E_ID2, event type information of a voice event as E_ID3, and event type information of a game event as E_ID4.

At time t5, the first motion detection section 132 notifies the event information generation section 140 that the first motion event has occurred between time t1 and time t5. In response to this notification, the event information generation section 140 generates event information including a combination of the event type information (E_ID1) and the event time information (time t1 to time t5). Further, at time t10, the first motion detection section 132 notifies the event information generation section 140 that the first motion event has occurred between time t9 and time t10. In response to this notification, the event information generation section 140 generates event information including a combination of the event type information (E_ID1) and the event time information (time t9 to time t10).

At time t4, the second motion detection section 134 notifies the event information generation section 140 that the second motion event has occurred between time t3 and time t4. In response to this notification, the event information generation section 140 generates event information including a combination of the event type information (E_ID2) and the event time information (time t3 to time t4). Further, at time t13, the second motion detection section 134 notifies the event information generation section 140 that the second motion event has occurred between time t12 and time t13. In response to this notification, the event information generation section 140 generates event information including a combination of the event type information (E_ID2) and the event time information (time t12 to time t13).

At time t6, the voice detection section 136 notifies the event information generation section 140 that the voice event has occurred between time t3 and time t6. In response to this notification, the event information generation section 140 generates event information including a combination of the event type information (E_ID3) and the event time information (time t3 to time t6). Further, at time t11, the voice detection section 136 notifies the event information generation section 140 that the voice event has occurred between time t8 and time t11. In response to this notification, the event information generation section 140 generates event information including a combination of the event type information (E_ID3) and the event time information (time t8 to time t11). It is noted that, with regard to the voice event, if voice volume information and text data, which is the result of voice recognition, have been notified from the voice detection section 136, the event information generation section 140 includes these pieces of information and data in the event information.

The game execution section 110 notifies the event information generation section 140 that the game event has occurred at time t1 and that the game event has ended at time t7. In response to this notification, the event information generation section 140 generates event information including a combination of the event type information (E_ID4) and the event time information (time t1 to time t7). Further, the game execution section 110 notifies the event information generation section 140 that the game event has occurred at time t12 and that the game event has ended at time t14. In response to this notification, the event information generation section 140 generates event information including a combination of the event type information (E_ID4) and the event time information (time t12 to time t14).

Each time the event information generation section 140 generates event information, the event information generation section 140 supplies the event information to the communication section 102, and the communication section 102 transmits the event information to a collection server 14. That is, the communication section 102 transmits the event information to the collection server 14 while the user A is viewing the content. At this time, information (content identifier (ID)) for identifying the content data may be assigned to the event information. The collection server 14 stores the event information transmitted from the communication section 102 in association with information (device ID) for identifying the information processing apparatus 10.

Figure 6:
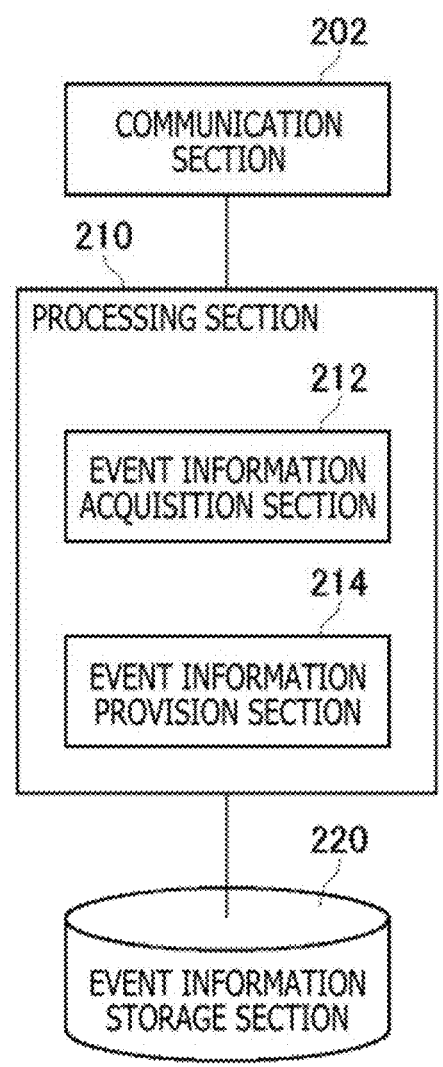
FIG. 6 is a diagram illustrating functional blocks of a collection server.

FIG. 6 illustrates functional blocks of the collection server 14. The collection server 14 includes a communication section 202, a processing section 210, and an event information storage section 220. The processing section 210 includes an event information acquisition section 212 and an event information provision section 214.

The communication section 202 receives event information from the information processing apparatus 10, and the event information acquisition section 212 acquires the event information. The event information acquisition section 212 stores the acquired event information, together with the content ID, in the event information storage section 220 in association with the device ID of the information processing apparatus 10. In the information processing apparatus 10, the communication section 102 sequentially transmits the generated event information while the recording processing section 116 is recording the content data. As a result, the event information acquisition section 212 acquires a large number of pieces of event information related to the content. The event information acquired by the event information acquisition section 212 is used as information for communicating an excitement point of the content to the viewing user.

Returning to FIG. 4, in response to the end of the user A's game play, the recording processing section 116 stops recording the content data and the user voice data. The recording processing section 116 generates a content file in which the recorded content data and user voice data are associated with the recording time. The recording processing section 116 may create the content file in the predetermined compression format. It is noted that the functions of the activity acquisition section 120, the activity detection section 130, and the event information generation section 140 may continue to be executed even after the user A has ended the game play. It is noted that, when the game play has ended, the second motion acquisition section 124 and the voice acquisition section 126 in the activity acquisition section 120, and the second motion detection section 134 and the voice detection section 136 in the activity detection section 130 may remain active and the event information generation section 140 may generate event information.

The user A can upload the content file stored in the auxiliary storage apparatus 2 to the video distribution server 17. When the user A operates the SHARE button 81 on the input apparatus 6, image data sharing processing starts and the upload processing section 142 generates input images indicating options for sharing image data.

Figure 7:
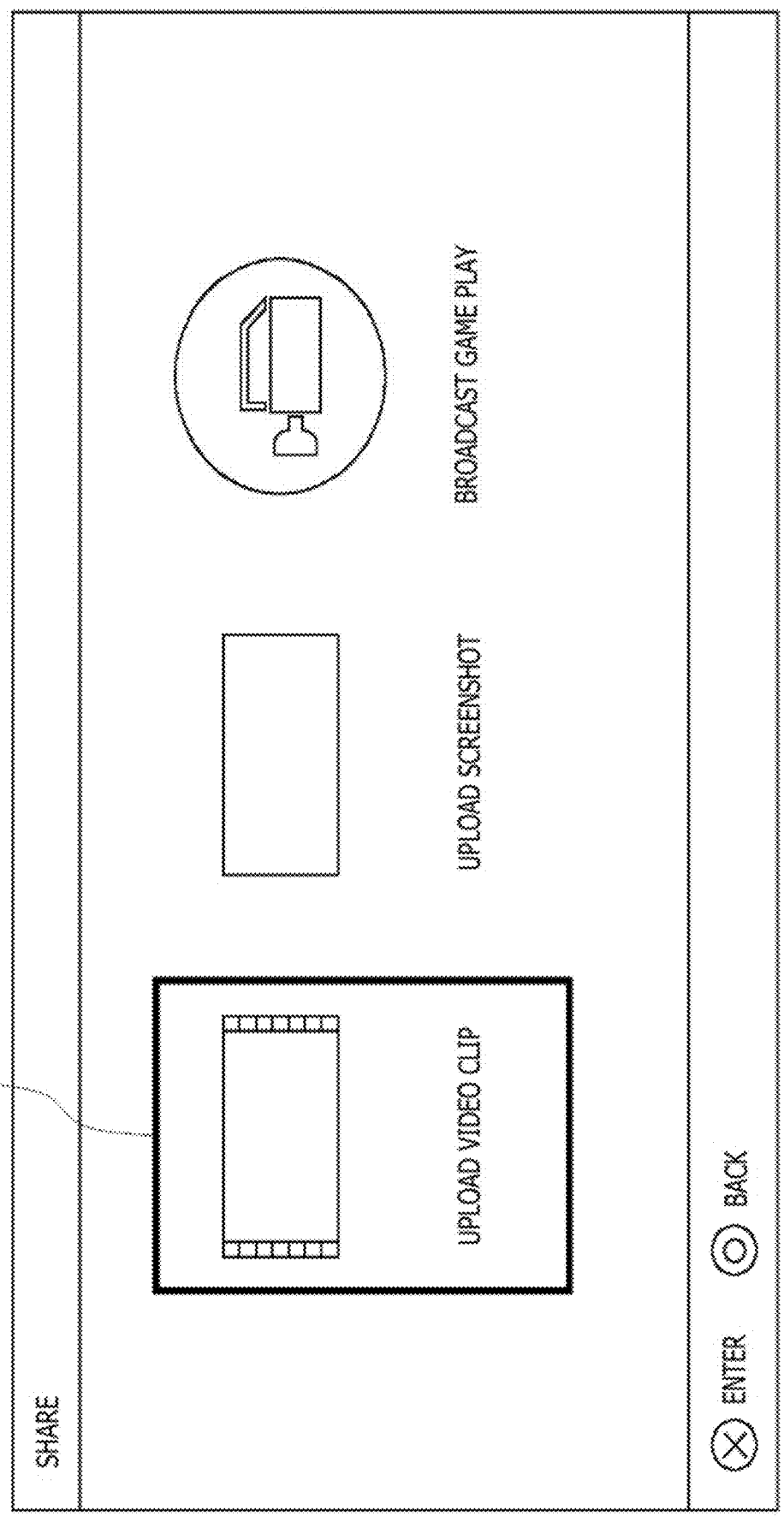
FIG. 7 is a view illustrating an example of an input screen depicting options for sharing processing.

FIG. 7 illustrates an example of an input screen depicting the options for the sharing processing. The upload processing section 142 generates the input images depicting the options for the sharing processing and causes the image processing section 114 to cause the output apparatus 4 to display the input images. On this input screen, three options related to image sharing are depicted. "Upload video clip" is a GUI for specifying upload of a content file recorded in the auxiliary storage apparatus 2 to the video distribution server 17. "Upload screenshot" is a GUI for specifying upload of a screenshot image to the video distribution server 17. "Broadcast game play" is a GUI for specifying live broadcasting of game play image and sound data via the video distribution server 17. The user A moves a selection frame 200, selects one of the GUIs, and depresses an enter button by operating the input apparatus 6. In response, the sharing processing for the selected image is performed. In the embodiment, the user selects the "Upload video clip" GUI. After that, the user selects a content file to be uploaded, thereby starting the upload processing.

The upload processing section 142 instructs the communication section 102 to transmit the selected content file. In response, the communication section 102 uploads the content file to the video distribution server 17.

At this time, the communication section 102 transmits time information to the collection server 14 together with the device ID. The time information indicates the start time and the end time of the content file uploaded to the video distribution server 17. The communication section 102 may also transmit the content ID for identifying the content of the content file together. In this case, the communication section 102 transmits the device ID, the content ID, and the time information indicating the start time and the end time of the content file to the collection server 14.

In the collection server 14, the event information provision section 214 extracts, from the event information storage section 220, event information that is associated with the device ID and the content ID and included between the start time and the end time of the content file. The event information provision section 214 provides the extracted event information to an index generation server 15.

Figure 8:
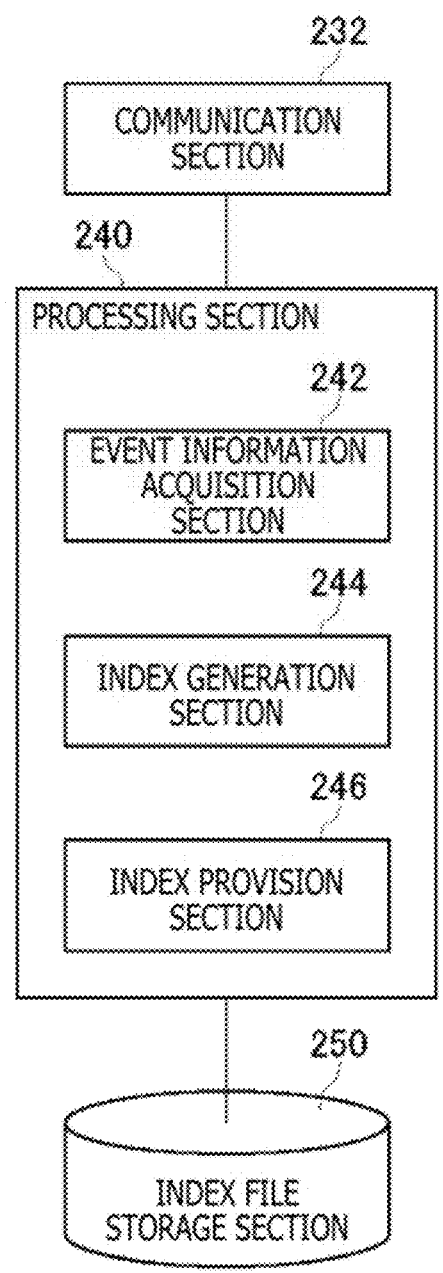
FIG. 8 is a diagram illustrating functional blocks of an index generation server.

FIG. 8 illustrates functional blocks of the index generation server 15. The index generation server 15 includes a communication section 232, a processing section 240, and an index file storage section 250. The processing section 240 includes an event information acquisition section 242, an index generation section 244, and an index provision section 246.

The communication section 232 receives event information from the collection server 14, and the event information acquisition section 2142 acquires the event information related to the content file uploaded to the video distribution server 17. The event information acquisition section 242 supplies the acquired event information to the index generation section 244. The index generation section 244 generates an index file including the event information included in the content file uploaded to the video distribution server 17.

The collection server 14 according to the embodiment serves to collect event information from the information processing apparatus 10 (or the information processing apparatus 12) at all times without being limited to during the user's game play. Although the index generation server 15 of the first server 13 is in charge of generating an index file in consideration of the load on the collection server 14, the collection server 14 may generate the index file. In other words, the first server 13 may be constituted by a single server.

Although, in the embodiment, the first server 13 and the second server 16 have been described as being operated by different operating entities, the first server 13 and the second server 16 may be operated by the same operating entity. If both of the servers are operated by the same operating entity, when the information processing apparatus 10 uploads a content file to the second server 16, the information processing apparatus 10 does not need to transmit time information indicating the start time and the end time of the uploaded content file to the first server 13, and the second server 16 only needs to transmit the time information indicating the start time and the end time of the content file to the first server 13.

In this manner, in the information processing system 1, a content file is uploaded to the video distribution server 17, and an index file associated with the content file is generated by the index generation server 15. In this state, the viewing user can view the content file by accessing the video distribution server 17 from the information processing apparatus 12.

Figure 9:
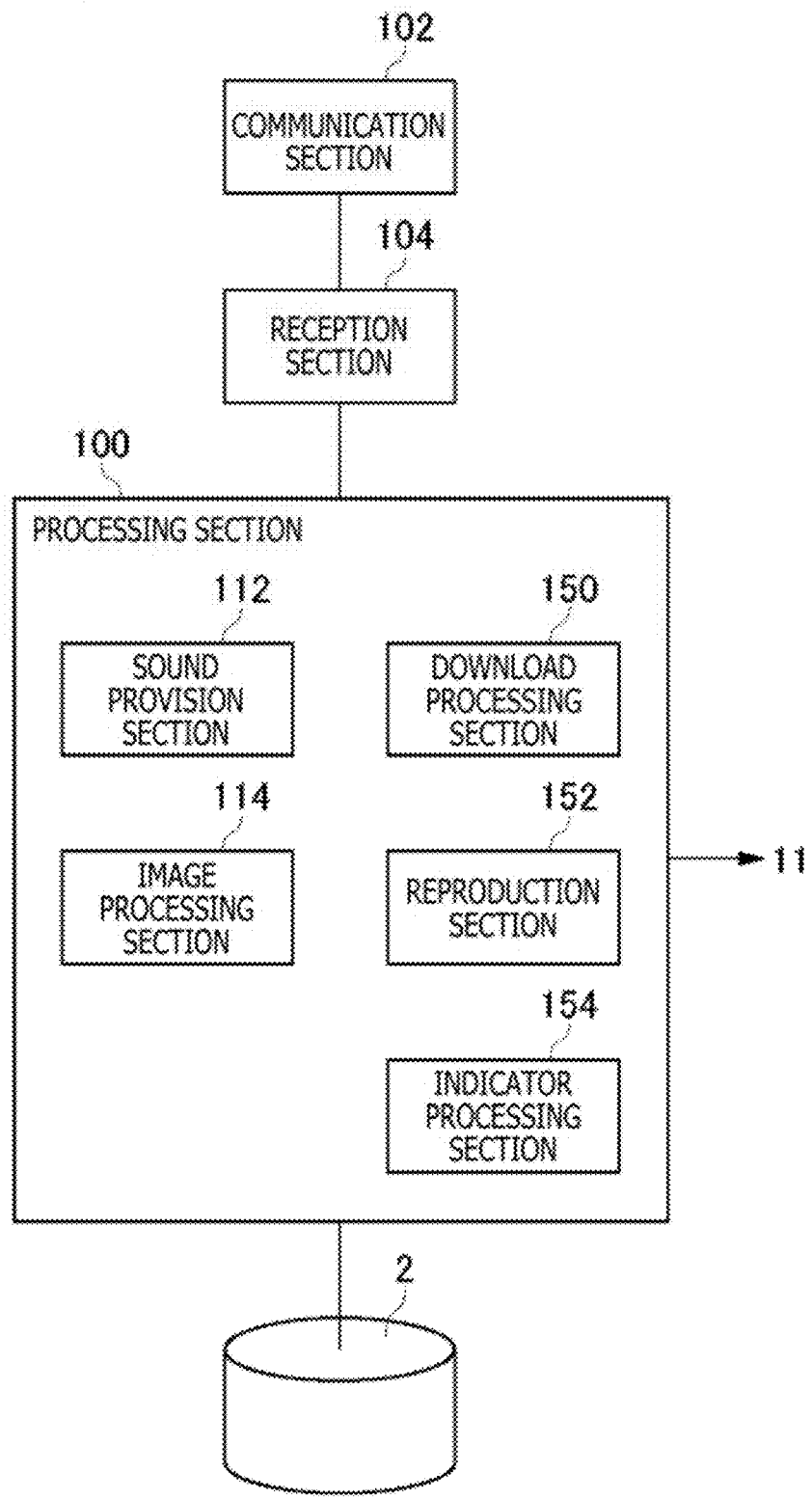
FIG. 9 is a diagram illustrating functional blocks of an information processing apparatus.

FIG. 9 illustrates functional blocks of the information processing apparatus 12 that downloads and reproduces a content file from the video distribution server 17. The information processing apparatus 12 includes the processing section 100, the communication section 102, and the reception section 104. The processing section 100 includes the sound provision section 112, the image processing section 114, a download processing section 150, a reproduction section 152, and an indicator processing section 154.

As described above, the hardware configuration of the information processing apparatus 12 is the same as the hardware configuration of the information processing apparatus 10 illustrated in FIG. 3. FIG. 9 illustrates functions used by the viewing user. Therefore, although not illustrated, the information processing apparatus 12 has the functional blocks of the information processing apparatus 10 illustrated in FIG. 4. Further, the information processing apparatus 10 has the functional blocks of the information processing apparatus 12 illustrated in FIG. 9.

Each of the components described as the functional blocks performing various processes in FIG. 9 can be constituted by a circuit block, a memory, or another LSI in terms of hardware, and is implemented by the system software, a game program loaded in a memory, or the like in terms of software. Therefore, it is to be understood by those skilled in the art that these functional blocks can be implemented in various forms by hardware only, software only, or combinations of hardware and software, and are not limited to any of these forms.

The download processing section 150 accesses the video distribution server 17 via the network service provided by the management server 5. Via the network service, the management server 5 can sort captured images of items of content accumulated in the video distribution server 17 and provide the sorted captured images to the information processing apparatus 12 as a list screen. The image processing section 114 displays a selection screen of content files uploaded to the video distribution server 17 on an output apparatus 11.

Figure 10:
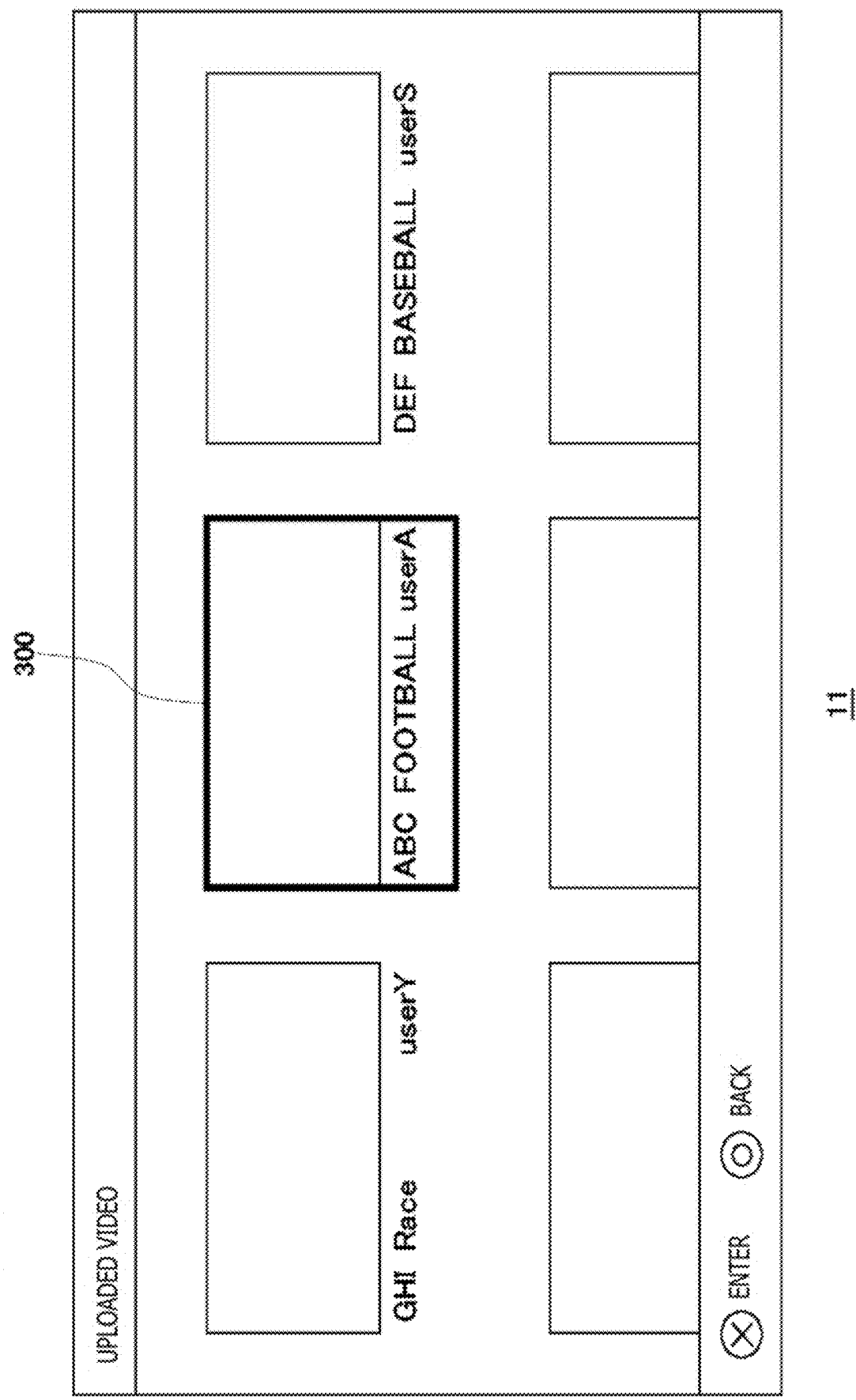
FIG. 10 is a view illustrating a list screen of items of uploaded content.

FIG. 10 illustrates the list screen of items of uploaded content. The management server 5 manages information regarding the items of uploaded content in the video distribution server 17, and the download processing section 150 acquires the information regarding the items of content from the management server 5 and generates the list screen. The information regarding the items of content may include captured images of games, game titles, and distributor identification information.

The management server 5 may generate the list screen of the items of content by referring to index files generated by the index generation server 15. For example, the management server 5 may arrange the items of content in ascending or descending order of the number of distributor utterances by referring to the index files. Further, without being limited to utterances, the items of content may be arranged in ascending or descending order of the number of events included in each content. Further, in a case where the result of user voice recognition is included in the index files, the management server 5 may extract and arrange items of content including a predetermined word. At this time, the viewing user may input the predetermined word as a search word, and the management server 5 may extract items of contents in response.

By operating the input apparatus 6, the viewing user moves a selection frame 300 and places the selection frame 300 on content information that the viewing user wants to view. In the example illustrated in FIG. 10, the selection frame 300 is placed on content information with the game title "ABC FOOTBALL" uploaded by the user A. In response to the viewing user operating the enter button of the input apparatus 6, a download request specifying the content file is transmitted to the video distribution server 17.

In response to the viewing user specifying the content file, the video distribution server 17 distributes the specified content file to the information processing apparatus 12 of the viewing user. At this time, the management server 5 instructs the index generation server 15 to transmit an index file corresponding to this content file to the information processing apparatus 12. In response, the index provision section 246 of the index generation server 15 reads the index file corresponding to the content file of "ABC FOOTBALL" of the user A from the index file storage section 250, and transmits the index file to the information processing apparatus 12 of the viewing user via the communication section 232.

The download processing section 150 downloads the content file from the video distribution server 17 and stores the content file in the auxiliary storage apparatus 2. Further, the download processing section 150 also downloads the index file from the index generation server 15 and stores the index file in the auxiliary storage apparatus 2. It is noted that the content file may be streamed from the video distribution server 17.

The reproduction section 152 reproduces the content file. The sound provision section 112 outputs reproduced sound from the output apparatus 11, and the image processing section 114 outputs a reproduced game image from the output apparatus 11. The sound to be reproduced includes not only game sound but also voice uttered by the user.

When the reproduction section 152 reproduces the content file, the image processing section 114 reserves a region for displaying a reproduction position indicator on the screen of the output apparatus 11. The reproduction position indicator informs the viewing user of the reproduction position. The indicator processing section 154 displays the reproduction position indicator in the reserved region.

Figure 11:
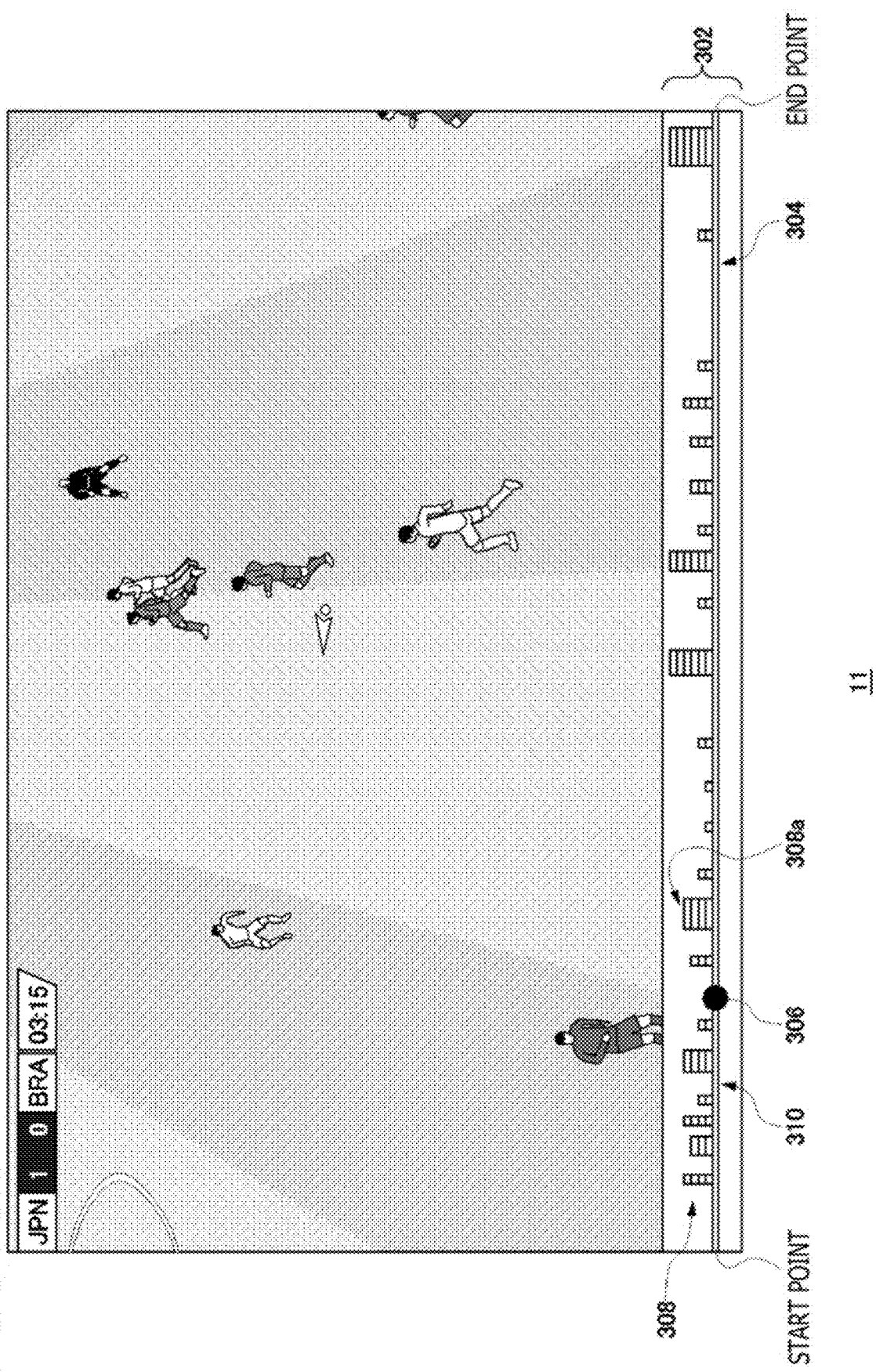
FIG. 11 is a view illustrating an example of a game image reproduction screen.

FIG. 11 illustrates an example of a game image reproduction screen. The image processing section 114 displays a reproduced game image in a main display region, while displaying a reproduction position indicator 310 in an indicator display region 302. The reproduction position indicator 310 indicates the reproduction position. In the example illustrated in FIG. 11, the reproduction position indicator 310 is displayed as a seek bar.

A pointer 306 is moved along a line 304 and serves to relatively indicate the reproduction position of a content file. The indicator processing section 154 expresses the time length of the content file with the line length from a start point to an end point, while expressing the reproduction position of the content file with the position of the pointer 306 relative to the line 304. The reproduction position indicator 310 is a GUI operable by the user, and the user can specify and operate the reproduction position of the content file by moving the position of the pointer 306 along the line 304.

The indicator processing section 154 displays event marks 308 along the line 304 by referring to each event information included in the index file. Each event mark 308 expresses the occurrence of an event. The indicator processing section 154 determines the position of each event mark 308 according to time information included in the corresponding event information. It is noted that, since a display region of the line 304 is limited, it is necessary to divide the display region by a predetermined time unit in order to display the event marks 308 in a time direction. The time only needs to be set according to the length of the content file. For example, if the content is 60 minutes long, the time unit may be set to approximately 5 seconds. In this case, the event mark 308 is displayed every 5 seconds. The event mark 308 is also used as a jump point for reproduction.

Since there are multiple event types available as illustrated in FIG. 5, event occurrences may, in some cases, overlap at the same time. Therefore, the indicator processing section 154 treats the above-described time unit (five seconds) as a single period of time. In a case where plural event occurrence periods are included in the same period of time, the indicator processing section 154 displays plural event marks 308 such that the plural event marks 308 are tiled in a predetermined direction relative to the line.

Figure 12:
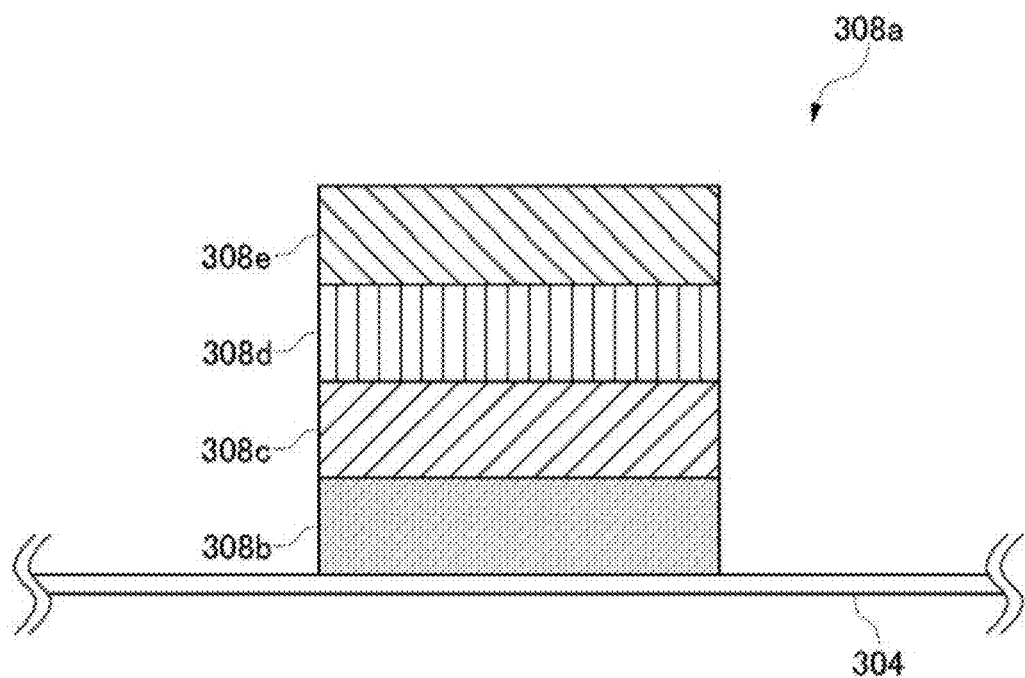
FIG. 12 is a view illustrating the details of plural event marks stacked.

FIG. 12 illustrates the details of plural event marks 308a stacked. In a case where plural event occurrence periods are included in the same period of time, the indicator processing section 154 displays plural event marks 308b, 308c, 308d, and 308e such that the plural event marks 308b, 308c, 308d, and 308e are tiled in the predetermined direction relative to the line 304. It is noted that the direction in which the event marks 308 are stacked relative to the line 304 is the direction perpendicular to the line 304.

When the plural event marks 308b, 308c, 308d, and 308e are stacked, this means that plural types of events have occurred at the same time. The indicator processing section 154 sets a display mode of each event mark 308 according to the type of event. The display mode may be, for example, a pattern or a color. In either case, it is preferable that the viewing user can recognize which type of event has occurred from the display mode of the event mark 308. As for the collection of the event marks 308a illustrated in FIG. 12, all the event marks 308b, 308c, 308d, and 308e have different display modes. Therefore, the viewing user recognizes that four types of events have occurred at the same time during this period of time.

Although the event marks 308 are set to have the same height as each other in the stacking direction in the illustrated example, a weight may be set for each event so that the event marks 308 have different heights. Further, even if the events are the same, the heights of the event marks 308 may be set to be differentiated depending on the event contents.

For example, a voice event is provided with volume information. Therefore, a voice event with high volume may be assigned a high event mark 308, while a voice event with low volume may be assigned a low event mark 308. Further, a voice event including a word that is obtained as the result of the speech recognition processing and is likely to attract the interest of the viewing user may be assigned a high event mark 308.

The viewing user can check an excitement point by simply looking at the height of the event marks 308 stacked. Placing a cursor on the event mark 308 of a voice event may display text data of the user utterance. By looking at the user utterance text, the viewing user can assume an event that has occurred during this period of time. Further, the user can immediately view a content image by placing the pointer 306 over the position.

Figure 13:
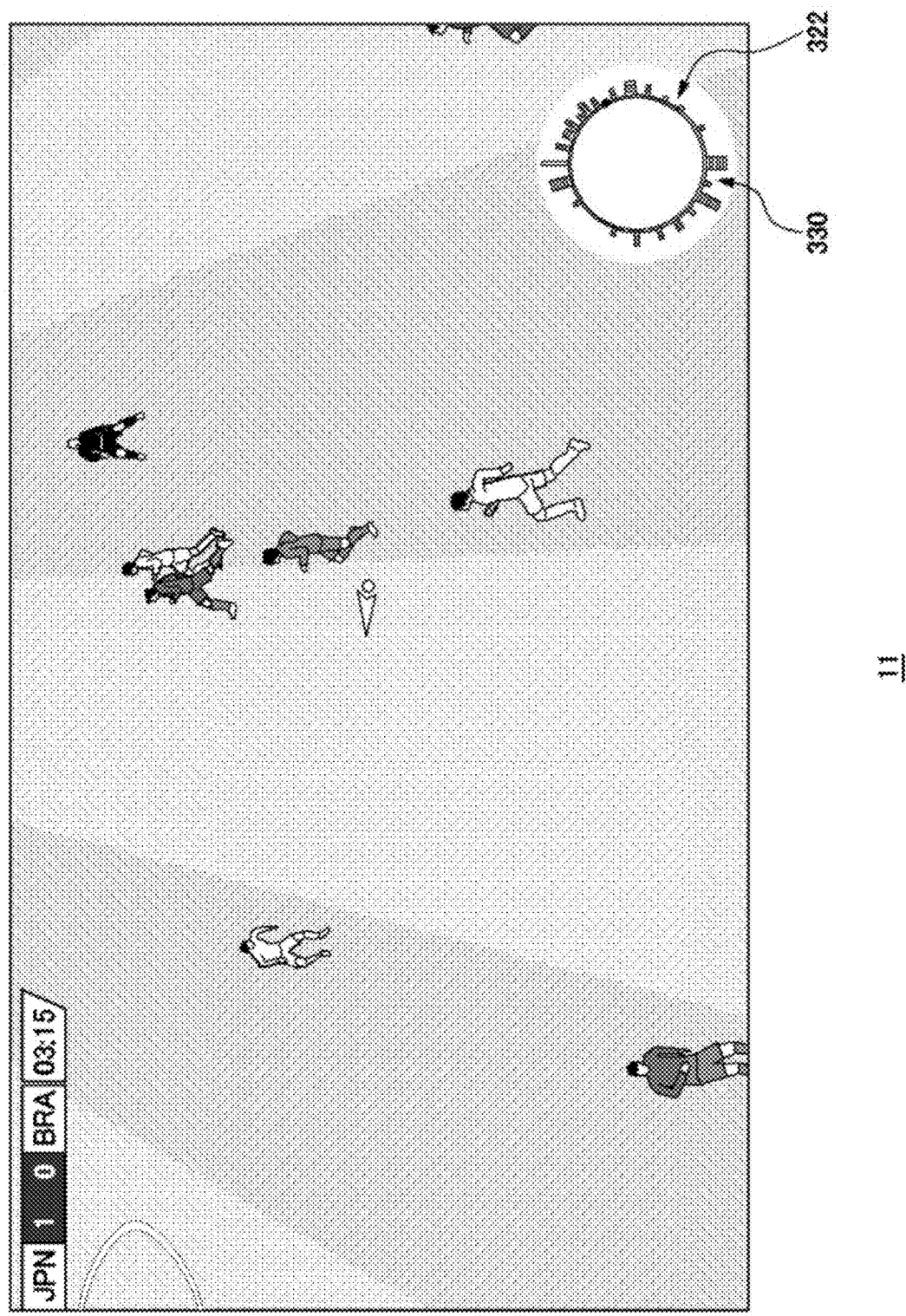
FIG. 13 is a view illustrating an example of the game image reproduction screen.

FIG. 13 illustrates another example of the game image reproduction screen. The image processing section 114 displays a reproduced game image in the main display region, while displaying the reproduction position indicator 310, which indicates the reproduction position, in an indicator display region 322. The indicator display region 322 is provided in part of the main display region. In the example illustrated in FIG. 13, a reproduction position indicator 330 is displayed as a seek ring.

Figure 14:
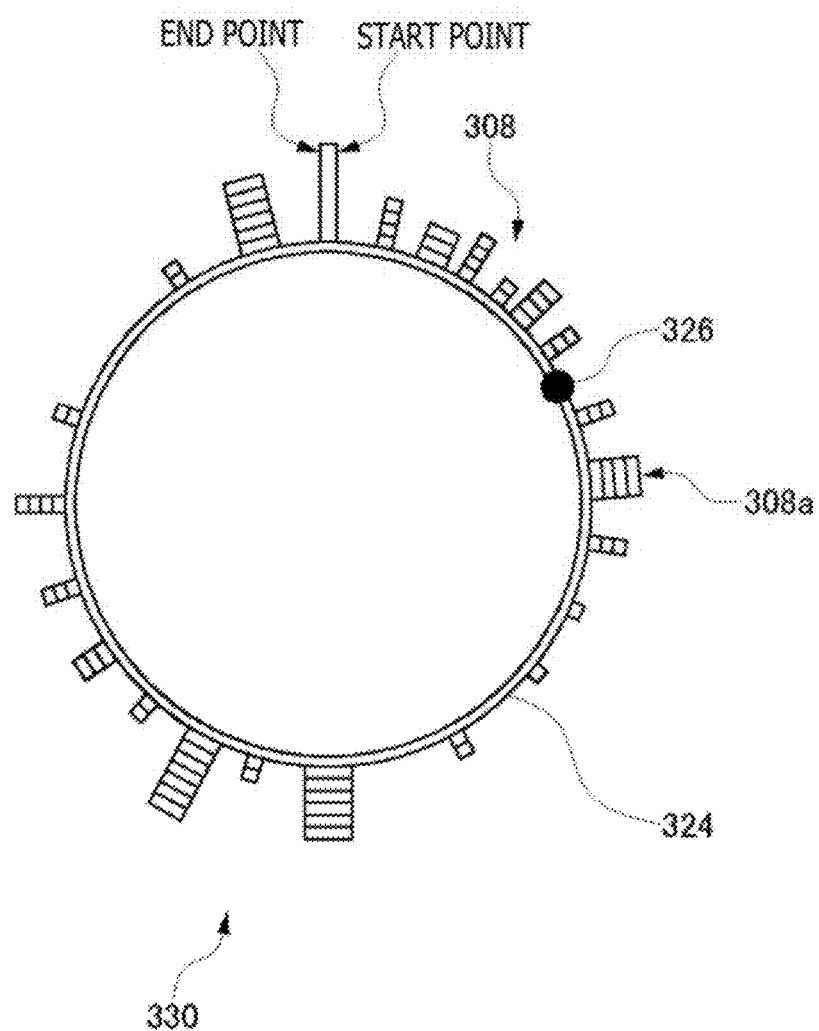
FIG. 14 is an enlarged view of a reproduction position indicator.

FIG. 14 is an enlarged view of the reproduction position indicator 330. A pointer 326 is moved along a circular line 324 and serves to relatively indicate the reproduction position of a content file. The indicator processing section 154 expresses the time length of the content file with the line length from a start point to an end point, while expressing the reproduction position of the content file with the position of the pointer 326 relative to the line 324. The reproduction position indicator 330 is a GUI operable by the user, and the user can specify and operate the reproduction position of the content file by moving the position of the pointer 326 along the line 324. As a difference from the reproduction position indicator 310 illustrated in FIG. 11, the indicator processing section 154 expresses the reproduction position of the content with the position of the pointer 326 on the circular line 324, and the direction in which the time advances is the clockwise direction.

The indicator processing section 154 displays the event marks 308 along the line 324 by referring to each event information included in an index file. Each event mark 308 expresses the occurrence of an event. The indicator processing section 154 determines the position of each event mark 308 according to time information included in the corresponding event information. It is noted that a method of arranging the event marks 308 is the same as that for the reproduction position indicator 310.

In response to a tilting operation of the analog stick 77, the indicator processing section 154 may display text data included in event information that is present in the corresponding direction of the reproduction position indicator 330.

Figure 15:
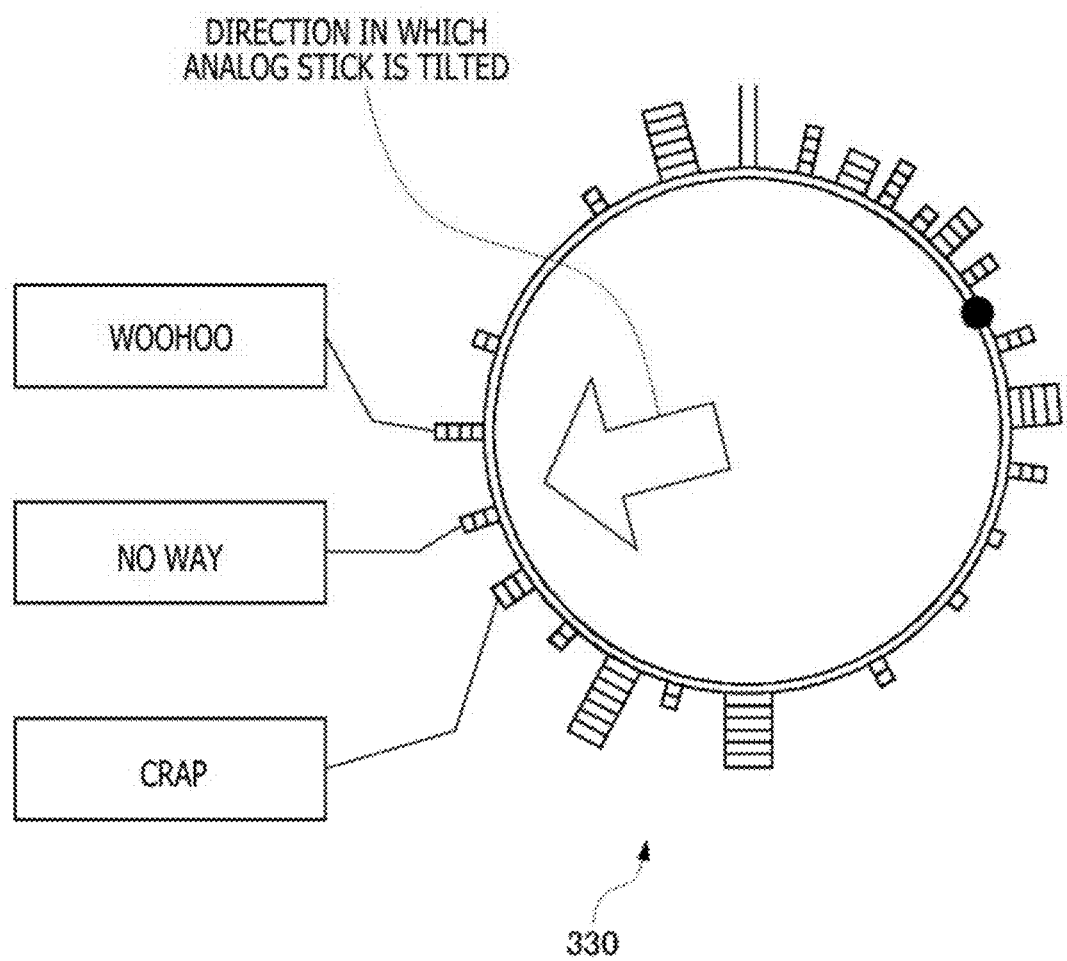
FIG. 15 is a view illustrating an example of text display.

FIG. 15 illustrates an example of text display. The indicator processing section 154 displays the texts in association with the respective event marks 308 so that the viewing user can easily recognize each event that has occurred. It is noted that, instead of displaying texts, the indicator processing section 154 may display icons in association with the respective event marks 308. An icon represents a connotation expressed by a text. For example, a skull icon may indicate that the content of the utterance is negative, while a heart icon may indicate that the content of the utterance is positive.

It is noted that the indicator processing section 154 may provide a user interface (UI) that searches texts included in pieces of event information.

FIG. 16 illustrates a text search box. When the viewing user enters a search keyword, the indicator processing section 154 may search the texts included in the pieces of event information and display resulting texts in association with the respective event marks 308.

It is noted that, in a case where it is difficult to display the reproduction position indicator 330 in a large size as illustrated in FIG. 13, a function for displaying the reproduction position indicator 330 in a larger size may be provided. For example, in response to the viewing user tilting the analog stick, the line 324 that is present in the direction in which the analog stick is tilted may be displayed in a larger size. The magnification rate may be set so as to be changeable in response to a predetermined button operation performed at this time.

The present disclosure has been described above on the basis of the embodiment. The above-described embodiment is an exemplification and it is to be understood by those skilled in the art that various modifications can be made to combinations of each constituent component and each processing process in the embodiment and that such modifications also fall within the scope of the present disclosure. Although the game is presented as content in the embodiment, content may include a video other than the game. Further, although the first server 13 and the second server 16 have been described as being managed by different operating entities in the embodiment, both of the servers may be managed by one operating entity.

INDUSTRIAL APPLICABILITY

The present disclosure can be used in the field of generation and/or reproduction of a content file.

REFERENCE SIGNS LIST

1: Information processing system
5: Management server

6: Input apparatus
10: Information processing apparatus
12*b*, 12*c*: Information processing apparatus
13: First server
14: Collection server
15: Index generation server
16: Second server
17: Video distribution server
100: Processing section
102: Communication section
104: Reception section
110: Game execution section
112: Sound provision section
114: Image processing section
116: Recording processing section
120: Activity acquisition section
122: First motion acquisition section
124: Second motion acquisition section
126: Voice acquisition section
130: Activity detection section
132: First motion detection section
134: Second motion detection section
136: Voice detection section
140: Event information generation section
142: Upload processing section
150: Download processing section
152: Reproduction section
154: Indicator processing section
202: Communication section
210: Processing section
212: Event information acquisition section
214: Event information provision section
220: Event information storage section
232: Communication section
240: Processing section
242: Event information acquisition section
244: Index generation section
246: Index provision section
250: Index file storage section
310: Reproduction position indicator
330: Reproduction position indicator

The invention claimed is:

1. An information processing system in which an information processing apparatus is connected to one or more servers,
wherein the information processing apparatus includes:
a camera configured to acquire a movement of a user;
a voice acquisition section configured to acquire a voice of a user viewing content,
a recording processing section configured to record content data and user voice data acquired by the voice acquisition section and generate a content file in which the content data and the user voice data are associated with a recording time,
a voice detection section configured to detect whether or not the voice of the user has been acquired by the voice acquisition section,
an event information generation section configured to generate event information for a plurality of events occurring while the user is viewing the content, the plurality of events including:
voice events exceeding a predetermined voice threshold,
first motion events exceeding a first predetermined threshold,
second motion events exceeding a second predetermined threshold greater than the first predetermined motion threshold, and
game events related to the content; a transmission section configured to transmit the event information to a server, and the server includes:
an event information acquisition section configured to acquire the event information transmitted from the information processing apparatus,
wherein, during reproduction of the content file, a plurality of event marks are stacked in a predetermined direction relative to a time line of the content file if a plurality of different events from the plurality of events overlap in time.

2. The information processing system according to claim 1, wherein the transmission section transmits the event information to the server while the user is viewing the content.

3. The information processing system according to claim 1,
wherein the transmission section uploads the content file to another server that is different from the server and that has a video distribution function, and transmits time information indicating a start time and an end time of the uploaded content file to the server, and
the server includes an index generation section configured to generate an index file including the event information included between the start time and the end time of the content file.

4. The information processing system according to claim 1,
wherein the transmission section uploads the content file to another server that is different from the server and that has a video distribution function,
the another server transmits time information indicating a start time and an end time of the uploaded content file to the server, and
the server includes an index generation section configured to generate an index file including the event information included between the start time and the end time of the content file.

5. The information processing system according to claim 3, wherein, in response to a viewing user specifying a content file, the another server distributes the specified content file to a terminal apparatus of the viewing user, while the server transmits the index file corresponding to the content file to the terminal apparatus of the viewing user.

6. An information processing apparatus comprising:
an activity acquisition section configured to acquire a plurality of events of a user viewing content, wherein the plurality of events comprise:
voice events exceeding a predetermined voice threshold
first motion events exceeding a first predetermined threshold,
second motion events exceeding a second predetermined threshold greater than the first predetermined motion threshold, and
game events related to the content;
a recording processing section configured to generate a content file in which content data is associated with a recording time;
an event information generation section configured to generate event information including a start time and an end time of the plurality of; and
a transmission section configured to transmit the event information to a server, wherein, during reproduction of the content file, a plurality of event marks are stacked in a predetermined direction relative to a time line of the content file if a plurality of different events from the plurality of events overlap in time.

7. A content file generation method for generating a content file, the method comprising:
  acquiring a plurality of events related to a user viewing content,
  wherein the plurality of events comprise:
    voice events exceeding a predetermined voice threshold
    first motion events exceeding a first predetermined threshold,
    second motion events exceeding a second predetermined threshold greater than the first predetermined motion threshold, and
    game events related to the content;
  generating a content file in which content data is associated with a recording time;
  detecting whether or not the plurality of events have been acquired;
  generating event information including a start time and an end time of each of the plurality of events; and
  transmitting the event information to a server,
  wherein, during reproduction of the content file, a plurality of event marks are stacked in a predetermined direction relative to a time line of the content file if a plurality of different events from the plurality of events overlap in time.

8. A non-transitory computer readable medium having stored thereon a program for a computer, comprising:
  by an activity acquisition section, acquiring activity plurality of events related to a user viewing content,
  wherein the plurality of events comprise:
    voice events exceeding a predetermined voice threshold
    first motion events exceeding a first predetermined threshold,
    second motion events exceeding a second predetermined threshold greater than the first predetermined motion threshold, and
    game events related to the content;
  by a recording processing section, generating a content file in which content data is associated with a recording time;
  by an activity detection section, detecting whether or not the plurality of events have been acquired;
  by an event information generation section, generating event information including a start time and an end time of each of the plurality of events; and
  by a transmission section, transmitting the event information to a server,
  wherein, during reproduction of the content file, a plurality of event marks are stacked in a predetermined direction relative to a time line of the content file if a plurality of different events from the plurality of events overlap in time.

* * * * *